(12) United States Patent
Donaldson

(10) Patent No.: US 6,494,638 B1
(45) Date of Patent: Dec. 17, 2002

(54) POWER DRIVE ADAPTER DEVICE

(76) Inventor: Joseph Donaldson, 130 N. Morgan, Wheaton, IL (US) 60187

( * ) Notice: Subject to any disclaimer, the term of this patent is extended or adjusted under 35 U.S.C. 154(b) by 0 days.

(21) Appl. No.: 09/405,782

(22) Filed: Sep. 27, 1999

(51) Int. Cl.[7] .............................. F16B 3/00; F16D 1/00
(52) U.S. Cl. ........................... 403/347; 30/500; 30/457; 403/398
(58) Field of Search .................. 30/500, 457; 403/347, 403/157, 213, 235, 398; 144/28.4

(56) References Cited

U.S. PATENT DOCUMENTS

| | | | |
|---|---|---|---|
| 510,518 A | | 12/1893 | Price |
| 762,754 A | | 6/1904 | Perkins |
| 2,366,928 A | | 1/1945 | Paschell |
| 2,470,387 A | | 5/1949 | Baggett |
| 3,049,096 A | | 8/1962 | Hampton |
| 3,776,286 A | * | 12/1973 | Blanck ............... 144/28.5 |
| 3,979,827 A | * | 9/1976 | Anzur ................. 30/379 |
| 4,050,487 A | * | 9/1977 | Mabuchi et al. ........ 144/28.5 |
| 4,244,083 A | * | 1/1981 | Aremka et al. ......... 24/16 R |
| 4,270,833 A | * | 6/1981 | Brenner ............... 339/99 R |
| 4,598,478 A | | 7/1986 | Buschle |
| 4,720,094 A | * | 1/1988 | Danchulis ............. 272/73 |
| 5,647,138 A | | 7/1997 | Tang et al. |
| 6,044,559 A | * | 4/2000 | Holst ................. 30/122 |
| 6,092,293 A | * | 7/2000 | Donaldson ............. 30/457 |
| 6,099,211 A | * | 8/2000 | Lee et al. ............ 408/1 R |
| 6,237,656 B1 | * | 5/2001 | Whitehead et al. ...... 144/28.3 |

* cited by examiner

Primary Examiner—Anthony Knight
Assistant Examiner—John B. Walsh
(74) Attorney, Agent, or Firm—Piper Rudnick; Michael L. Kenaga

(57) ABSTRACT

There is provided herein a power drive adapter for a pencil sharpener or other manually rotatable tool which affixes a shank to the tool. In one embodiment this affixation includes a peripheral edge positioned on the tool and a shank attached to that edge. In another embodiment a holder member having a yolk of dual prongs is fitted with a power drive compatible shank. The inner surface of the prongs has grooves for engaging protruding edges positioned on the tool. As a result, the holder member securely grasps the manually rotatable tool (pencil sharpener) at one extremity and presents at its other extremity a shank for insertion into the chuck of the chosen electric drive.

15 Claims, 1 Drawing Sheet

POWER DRIVE ADAPTER DEVICE

CROSS REFERENCE TO RELATED APPLICATIONS

This application for U.S. Patent incorporates by reference U.S. Pat. No. 6,092,293.

STATEMENT REGARDING FEDERALLY SPONSORED RESEARCH OR DEVELOPMENT

Not Applicable

BACKGROUND OF THE INVENTION

1. Field of the Invention

The present invention relates generally to the field of power driven tools, and more particularly to an adapter for applying power drive to a hand held tool. More specifically, this invention relates to the conversion of a manual pencil sharpener to a power driven device.

2. Description of the Prior Art

In the field of power tools, such as electric drills and electric screw drivers, a chuck is used to accept and clamp onto shanks of drill bits or other rotary tools. Unfortunately, many manually operated, hand held devices, such as the pencil sharpener described herein, are not fitted with a shank that can be grasped by a chuck, and are therefore not useable with common power drives.

SUMMARY OF THE INVENTION

Accordingly, it is the principal objective of the present invention to provide an adapter for converting manual hand held tools or devices to operate on common power drives.

It is a further object to provide such an adapter for specifically converting a hand held pencil sharpener to operate on a common electric drill or electric screw driver.

The present invention accomplishes these and other objects by providing a shank adaption for the pencil sharpener, or other manual tool, by the affixation of a shank to the base of the tool. In one embodiment a peripheral edge is provided on the tool and a shank is attached to that edge. Alternatively, a dual prong yolk device in the form of a concave holder member is fitted with a power drive compatible shank on one end thereof for insertion into the chuck of the chosen electric drive. The inner concave surface of this holder member exhibits a groove therein for engaging a protruding edge on the manual tool.

While the invention will be described in connection with a preferred embodiment, it will be understood that it is not the intent to limit the invention to that embodiment. On the contrary, it is the intent to cover all alternatives, modifications, and equivalents as may be included within the spirit and scope of the invention as defined by the appended claims.

DESCRIPTION OF THE PREFERRED EMBODIMENT

Turning now to the drawings there is shown a power drive adapter for a manual, hand held tool, and in particular, a hand held pencil sharpener. And while this specification describes adaption of the pencil sharpener depicted, it is to be understood that the power drive adaption described herein is not to be limited to that sharpener, but rather it is applicable to all hand held manual rotating tools.

Figure 1:
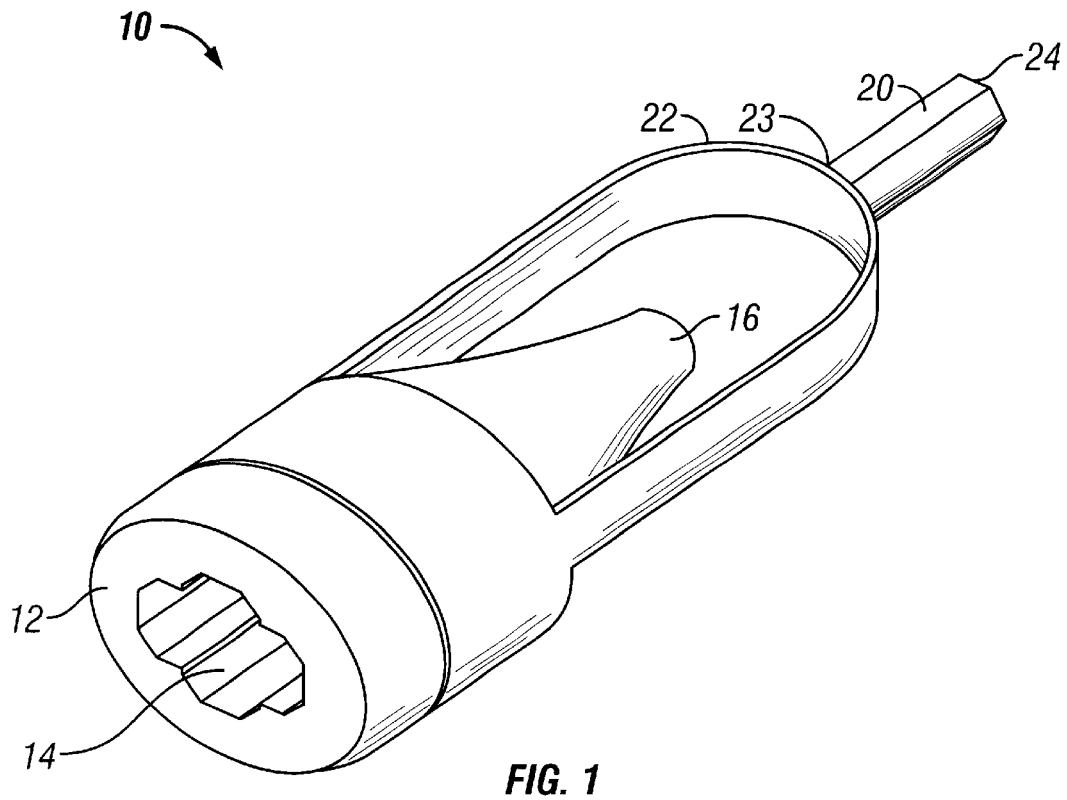
FIG. 1 is a perspective view of a power drive adapter for a hand held tool, such as a pencil sharpener, showing a shank mounted to a peripheral edge defined on the tool, in accordance with the present invention.
Figure 2:
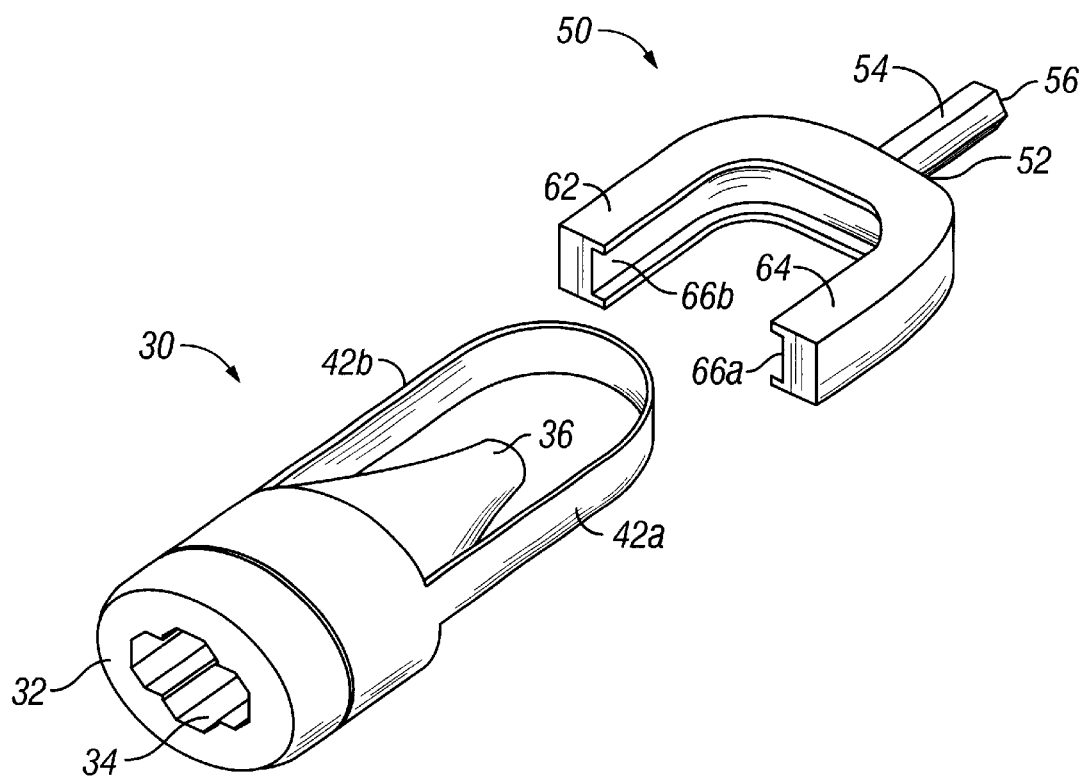
FIG. 2 is a perspective view of an adapting device for a hand held tool, such as a pencil sharpener, showing a shank mounted to a tool engageable holder member, in accordance with the present invention.

The pencil sharpener 10 depicted in FIG. 1 is of the type having an internal blade (not shown) and a rotatable collar 12. A pencil to be manually sharpened is inserted into the opening 14 of the collar, and the collar is then manually rotated relative to the base 16 (or the base is rotated relative to the collar) to effect the sharpening of the pencil. The pencil sharpener, and the depicted in FIG. 2, is described in detail in U.S. Pat. No. 6,092,293 which is incorporated herein by reference.

To adapt a manual tool of this rotatable type to be useable with a power drive having a chunk mechanism thereon (such as an electric screw driver or electric drill), a chuck compatible shank member 20 is fitted to the manual tool in such a manner that the resulting device can be rotated by the chuck of the power drive. In its simplest embodiment, attachment means in the form of a reinforcing peripheral edge 22 is provided on the tool and the base 23 of the shank member 20 is affixed to this defined edge. The free end 24 of the shank member is then mountable within the chuck of the desired power drive for power operation of the tool.

As an alternative embodiment, a shank adapting device (FIG. 2) includes a selectively engageable tool holder member 50 for attachment of the shank member and for holding a manually rotatable tool 30. Particularly, the tool 30 may comprise the aforementioned pencil sharpener, having an internal blade, a rotatable collar 32 and an opening 34 in the collar for insertion of a pencil. As before, in operation of this pencil sharpener, when a pencil is inserted into the opening and the collar 32 is rotated relative to the base 36 (or the base is rotated relative to the collar), the sharpening function occurs. FIG. 2 depicts the pencil sharpener positioned for selective engagement with the tool holder member 50, as described below.

The adapting device includes a reinforcing edge 42a–42b defined on the base of the tool and protruding, at least, on opposing sides 42a and 42b. The base of the tool holder member 50 has the base 52 of a chuck compatible shank member 54 attached on a first end, such that the free extremity 56 of the shank member is mountable within a chuck of the desired power drive. At its other end, this tool holder member 50 presents gripping means in the form of a yolk of dual prongs 62 and 64. These prongs form a concavity therebetween; and on this concave surface, the inner surface of the prongs, there are provided grooves 66a and 66b arranged to engage the opposing protruding edges 42a and 42b, respectively, of the tool when it is inserted into the tool holder member. Consequently, rotation of the tool holder member 50 by the shank member 54 causes rotation of the tool gripped by the prongs 62 and 64.

From the foregoing description, it will be apparent that modifications can be made to the apparatus and method for using same without departing from the teachings of the present invention. Accordingly, the scope of the invention is only to be limited as necessitated by the accompanying claims.

What is claimed is:

1. A power drive adapter for adapting a power drive for use with a tool, the adapter comprising:
   a shank member having a shank base defined on one end thereof and having a free extremity at the other end thereof adapted for engagement with the power drive; and an attachment means having,
a holder member, including a first end, a second end, a concave surface at said second end, the first end is secured to the shank base, and
a gripping means positioned within said concave surface and positioned at said second end of said holder member adapted for selectively gripping the tool, whereby the adapter allows the use of a power drive to drive a tool.

2. The adapter of claim 1 wherein said gripping means further comprises a groove defined within said concave surface, whereby the groove is capable of engagement with a protruding edge of the tool.

3. The adapter of claim 1 wherein said holder member exhibits dual prongs at said second end thereof defining an inner surface of said prongs, and wherein said gripping means is positioned on said inner surface of said prongs.

4. The adapter of claim 3, wherein said gripping means further comprises a groove defined on said inner surface of said prongs, whereby the groove is capable of engagement with a protruding edge of the tool.

5. The adapter of claim 1 wherein said holder member exhibits a yolk at said second end thereof and wherein said gripping means is positioned within said yolk.

6. The adapter of claim 5 wherein said gripping means further comprises grooves defined within said yolk, whereby the grooves are capable of engagement with protruding edges of the tool.

7. A power drive adapting device for adapting a power drive for use with a hand held pencil sharpener having a collar and a base relative to the collar, the adapting device comprising:
a shank member having a shank base defined on one end thereof and having a free extremity at the other end thereof capable of engagement with a power drive; and
attachment means secured to said shank base of said shank member and capable of affixing to the base of the pencil sharpener, the attachment means
includes a holder member having means capable of selective engagement with said base, said shank base is affixed to said holder member, said holder member includes a concave surface defined in said holder member, and said means capable of selective engagement with said base is positioned within said concave surface.

8. The adapting device of claim 7 wherein said means capable of selective engagement with said base comprises grooves defined in said holder member.

9. The adapting device of claim 7 wherein said means capable of selective engagement with said base comprises grooves defined in said concave surface.

10. The adapting device of claim 7 wherein said holder member comprises dual prongs defining an inner surface thereon, and said means capable of selective engagement with said base is positioned on said inner surface of said prongs.

11. The adapting device of claim 10 wherein said means capable of selective engagement with said base comprises grooves defined on said inner surface of said prongs.

12. The adapting device of claims 7 wherein said holder member comprises a yolk and said means capable of selective engagement with said base is positioned within said yolk.

13. The adapting device of claim 12 wherein said means capable of selective engagement with said base comprises grooves defined within said yolk.

14. A power drive adapting device for adapting a power drive for use with a hand held pencil sharpener having a collar and a base relative to the collar, the adapting device comprising:
a shank member having a shank base defined on one end thereof and having a free extremity at the other end thereof capable of engagement with a power drive; and
attachment means secured to said shank base of said shank member and capable of affixing to the base of the pencil sharpener, the attachment means includes a holder member having means capable of selective engagement with said base, said shank base is affixed to said holder member, said holder member includes dual prongs defining an inner surface thereon, and said means capable of selective engagement with said base is positioned on said inner surface of said prongs.

15. A power drive adapting device for adapting a power drive for use with a hand held pencil sharpener having a collar and a base relative to the collar, the adapting device comprising:
a shank member having a shank base defined on one end thereof and having a free extremity at the other end thereof capable of engagement with a power drive; and
attachment means secured to said shank base of said shank member and capable of affixing to the base of the pencil sharpener, the attachment means includes a holder member having means capable of selective engagement with said base, said shank base is affixed to said holder member, said holder member includes a yolk, and said means capable of selective engagement with said base is positioned within said yolk.

* * * * *